United States Patent [19]

Washkewicz

[11] 4,238,260

[45] Dec. 9, 1980

[54] METHOD OF MAKING AN ELASTOMERIC HOSE

[75] Inventor: Donald E. Washkewicz, Bedford Heights, Ohio

[73] Assignee: Parker-Hannifin Corporation, Cleveland, Ohio

[21] Appl. No.: 960,376

[22] Filed: Nov. 13, 1978

[51] Int. Cl.³ ............................................. B29D 23/05
[52] U.S. Cl. ................... 156/149; 138/125; 138/126; 138/140; 138/141; 138/153; 156/244.13
[58] Field of Search .................. 156/143, 149, 244.13, 156/244.12; 138/125, 126, 140, 141, 153, 172

[56] References Cited

U.S. PATENT DOCUMENTS

| | | | |
|---|---|---|---|
| 3,168,910 | 2/1965 | Galloway et al. | 156/149 |
| 3,921,674 | 11/1975 | Logan et al. | 138/130 |
| 3,953,270 | 4/1976 | Ford | 156/149 |
| 3,994,761 | 11/1976 | Higbee | 156/143 |
| 4,104,098 | 8/1978 | Hush et al. | 156/149 |

OTHER PUBLICATIONS

Santoprene—Thermoplastic Elastomers, Monsanto Industrial Chemicals Co., pp. 1-11.

*Primary Examiner*—Caleb Weston
*Attorney, Agent, or Firm*—James A. Baker

[57] ABSTRACT

A method for producing a high strength flexible composite hose, and a hose produced by the method. The method includes forming a hollow inner core of uncured thermosetting elastomeric material. One or more layers of reinforcement material are applied to the outer peripheral surface of the uncured core. The uncured core and the reinforcement material are then encapsulated with a thermoplastic elastomeric cover while maintaining the temperature of the core below its vulcanization temperature. The temperature of the core and reinforcement material and cover is then increased to and maintained at a temperature which is at least as great as the vulcanization temperature of the core but less than the melting temperature of the cover for a time sufficient to vulcanize the core. The cover material has a smaller coefficient of thermal expansion than the uncured core material, and the cover material has sufficient tensile strength at the core vulcanization temperature to prevent localized plastic strain of the cover and to prevent the core from bleeding through the cover. The thermoplastic elastomeric cover thus provides a mold for the core and reinforcement material to maintain the shape of the core during vulcanization, and provides a permanent protective sheath for the completed hose after vulcanization.

8 Claims, 3 Drawing Figures

METHOD OF MAKING AN ELASTOMERIC HOSE

BACKGROUND OF THE INVENTION

This invention relates to a method for producing a flexible composite hose, and to a hose produced by the method.

A prior art method of making a flexible composite hose includes extruding a thermosetting elastomeric material on a mandrel, applying a reinforcement material on the outer peripheral surface of the uncured elastomeric material, and extruding a thermosetting elastomeric material over the reinforcement material. Prior to vulcanization, the thermosetting elastomeric material is susceptible to physical damage due to the inability of the uncured material to resist plastic deformation. To avoid such physical damage, a lead jacket is extruded over the composite hose structure prior to vulcanization. The lead jacket acts as a mold during vulcanization to resist expansion and flow of the thermosetting elastomeric material at elevated temperatures. This method results in a highly compact product having a smooth outer periphery. Additionally, because the lead is somewhat rigid and less susceptible to plastic deformation than the uncured thermosetting elastomeric material, the lead jacket protects the hose from flatspotting during the vulcanization cycle. After curing, the lead jacket is stripped from the composite hose structure.

This process for making a composite hose structure is illustrated, for example, in U.S. Pat. No. 3,168,910. Other composite hose structures and methods using thermosetting elastomeric materials are shown in U.S. Pat. Nos. 3,921,674 and 3,953,270. A composite hose structure which does not require vulcanization is shown in U.S. Pat. No. 3,994,761. A particular thermoplastic elastomer is described in the publication titled "Thermoplastic Elastomers", available from Monsanto Industrial Chemicals Co., 260 Springside Drive, Akron, Ohio 44313.

SUMMARY OF THE INVENTION

The present invention departs from prior art methods and composite hose structures, and in particular eliminates the use of a lead jacket for confining the hose structure during the vulcanization process.

According to the method provided by this invention, a hollow elongated inner core of uncured thermosetting elastomeric material is formed on a mandrel. A reinforcement material, which may be fabric or metal or any other suitable material, is applied to the outer peripheral surface of the uncured core while maintaining the temperature of the core below its vulcanization temperature. The reinforcement material is applied with a sufficient tension to mechanically lock the reinforcement material to the uncured core. The reinforcement material and uncured core are then encapsulated with a thermoplastic cover while continuing to maintain the temperature of the core below its vulcanization temperature. The temperature of the core and reinforcing material and cover is then increased to and then maintained at a temperature that is at least equal to the vulcanization temperature of the core and below the melting temperature of the cover for a time period sufficient to vulcanize the core. The vulcanization is performed while maintaining the outer peripheral surface of the cover unsupported and while retaining 25% to 60% of the tensile strength of the cover to prevent localized plastic strain of the cover and to prevent the thermosetting elastomeric core from bleeding through the thermoplastic elastomeric cover.

By this method, the thermoplastic elastomeric material provides a mold for the thermosetting elastomeric core during the vulcanization process. The thermoplastic elastomeric cover does not degrade in a steam vulcanization environment, does not flatspot when wrapped on a reel for vulcanization, resists bleed through and pimpling, and results in a smooth unblemished cover. Additionally, stripping of a jacket material is not required since the thermoplastic elastomeric cover which provides the mold during vulcanization is retained to provide a permanent cover for the composite hose structure.

One embodiment of the invention uses a thermosetting elastomeric core, a single layer of reinforcement material disposed on the outer peripheral surface of the core, and a cover of thermoplastic elastomeric material. A second embodiment of the invention includes a plurality of layers of reinforcement material, and the layers of reinforcement material are separated from one another by a thermosetting or thermoplastic elastomeric insulation material. In both embodiments, the reinforcement material may be wire or fiber which may be braided or spirally wound about the core.

BRIEF DESCRIPTION OF THE DRAWINGS

These and other features and advantages of the invention are further described below with reference to the accompanying drawings, wherein.

DETAILED DESCRIPTION OF THE DRAWINGS

Figure 1:
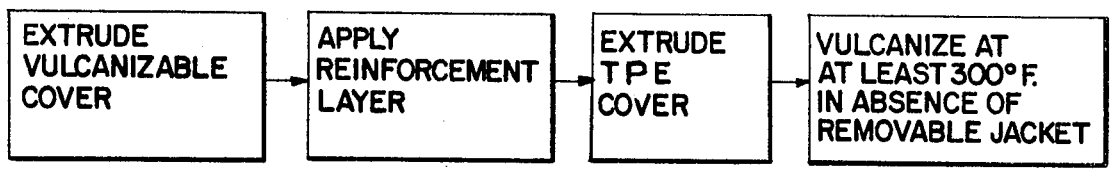
FIG. 1 is a flow chart showing the method in accordance with the present invention.

Referring now to the drawings in greater detail, a composite hose structure 10 includes an elongated cylindrical inner core 12 of a thermosetting elastomeric material, a layer 14 of reinforcement material, and an outer cover 16 of thermoplastic elastomeric material.

The core 12 is formed at an extruding station 20 by extruding an uncured thermosetting elastomeric material onto the outer peripheral surface of a mandrel (not shown). The thermosetting elastomeric material may be natural rubber or, preferably, a synthetic rubber such as nitrile, neoprene, butyl rubber, or the like. The selection of the particular thermosetting elastomeric material used for the core 12 will depend upon the end use and the properties desired of the composite hose structure. The extrusion temperature for the core 12 is 100° F. to 275° F., and the vulcanization temperature is 275° F. to 350° F. In the preferred embodiment, the core 12 is nitrile having an extrusion temperature of 200° F. and a vulcanization temperature of 300° F. in a steam environment for 2 hours at 50 psi. The coefficient of thermal expansion of the nitrile is about $6 \times 10^{-4}$ inch/inch/C°.

After extrusion, the core 12 is passed through a water bath at 50° F. to 150° F. for cooling purposes. The core 12 may then be wound on a reel for storage or it may proceed directly to the next step of the method.

The outer peripheral surface of the core 12 is then cooled to a temperature below room temperature in a well known manner to prevent excessive deformation of the core material when a reinforcement layer is applied. This cooling is accomplished at an ambient temperature of $-20°$ F. to $-80°$ F. and preferably $-60°$ F. by any suitable means such as a mechanical refrigeration device, liquid nitrogen, dry ice, or preferably liquid carbon dioxide.

Figure 2:
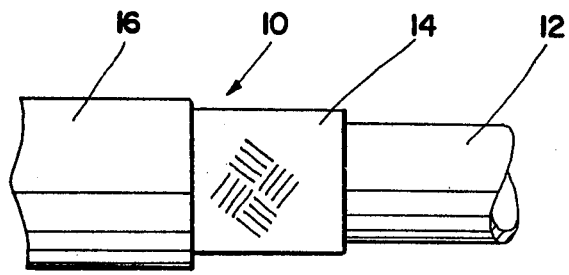
FIG. 2 is a side view, broken away in successive structural layers, of a composite hose structure in accordance with the present invention.

The reinforcement layer is applied at a braiding station 22. The layer 14 may be formed from metal wire such as carbon steel, copper, stainless steel, brass plated steel, or aluminum, or it may be a fibrous material such as rayon, Dacron, nylon or the like. Preferably, the layer 14 is formed of brass plated steel wire having a coefficient of thermal expansion of about $6 \times 10^{-6}$ inch/inch/C°. The reinforcement material may be applied as a braid, as shown in FIG. 2, or it may alternatively be spirally wound about the core 12. When the reinforcement material is spirally wound, one strand of the material is helically wound on the core 12 in one direction and another strand is helically would over the first strand in the opposite direction, and the two strands together comprise one layer of reinforcement material. During the application of the reinforcement material to the uncured core, tension is applied to the reinforcement material so that it firmly contacts the uncured core. This provides sufficient imbedding of the reinforcement material in the uncured thermosetting elastomeric core material so that an adhesive is not required to bond the reinforcement material to the core.

The cover 16 is extruded over the core 12 and reinforcement strands 14 at an extruding station 24. The cover 16 is of a thermoplastic elastomeric material which exhibits physical characteristics and properties at room temperature which are similar to those of vulcanized synthetic rubber, and which retains 25% to 60% of its tensile strength at the vulcanization temperature of the core 12. The cover 16 is extruded under sufficient pressure to be forced into the interstices existing within the reinforcement material layer 14 to form a mechanical interlock therewith. Because the cover 16 is pressure extruded, the mechanical interlock between the cover and the reinforcement material is sufficiently strong to maintain the reinforcement material in its proper position even though it may move slightly with the flexing of the hose. This arrangement minimizes abrasion at the interface between the reinforcement material and the cover. Additionally, this mechanical interlock improves retention of the metal fitting (not shown) that is subsequently attached to one end of the hose, since it prevents the cover from breaking away from the reinforcement material layer during assembly of the end fitting. This breaking away of the cover would cause the cover to bulge during subsequent hose pressurization and/or to wrinkle during flexing. Although not shown in the drawings, a layer of thermosetting elastomeric adhesive material can be used between the reinforcement material layer 14 and the cover 16 to increase the mechanical bond therebetween if so desired.

The melting temperature of the cover 16, and hence its extrusion temperature at the station 24, is 350° F. to 500° F. and is significantly higher than both the extrusion temperature and the vulcanization temperature of the core. However, it has been found that this high extrusion temperature of the cover 16 does not adversely affect the hose produced by this method.

The material for the cover 16 is also selected so that its coefficient of thermal expansion is sufficiently less than the coefficient of thermal expansion of the core 12 as to resist radial expansion of the core 12 through the braid interstices during a subsequent vulcanization step to produce a hose with no voids between its various layers. The coefficient of thermal expansion of the cover 16 is less than 50%, and preferably less than 25% of the coefficient of thermal expansion of the core 12.

The cover 16 is preferably a thermoplastic elastomeric material sold under the trademark SANTOPRENE and available from the Monsanto Company, 260 Springside Drive, Akron, Ohio 44313. The coefficient of thermal expansion of the cover 16 is about $8.6 \times 10^{-5}$ inch/inch/C°. The cover 16 has a melting temperature of 350° F. The cover 16 has a tensile strength at 212° F. and at 257° F. of 1400 psi and 1100 psi, respectively. The cover 16 retains at least 50% of its tensile strength when subjected to steam for 2 hours at 50 psi and 300° F., and does not degrade in a steam environment. The respective 100% moduli for the cover 16 at 212° F. and at 257° F. are 650 psi and 420 psi respectively. At a temperature of 300° F., the 100% modulus is about 278 psi and is sufficient to prevent localized plastic strain of the cover and to prevent the core 12 from bleeding through the cover and blemishing or pimpling the cover 16. The cover 16 also has a high resistance to compressive deformation at elevated temperature and a high resistance to creep or coldflow which gives the material resistance to flatspotting on reels during vulcanization.

After extrusion of the cover 16, the unfinished composite hose assembly consisting of the uncured thermosetting elastomeric core 12, the reinforcement material layer 14, and the thermoplastic elastomeric cover 16, is placed in an autoclave or similar vessel at a vulcanizing station 26 for vulcanizing the core 12. The physical properties of the thermoplastic cover 16 assure that the outer peripheral surface thereof remains smooth and uninterrupted, even in the absence of an adjacent solid confinement structure such as the lead jacket used in the process discussed above in the background of the invention.

In the autoclave 26, the temperature of the core and reinforcement material and cover is increased to and maintained at at least the vulcanization temperature of the core but below the melting temperature of the cover for a time period sufficient to vulcanize the core. In the preferred embodiment, the vulcanization is carried out at 300° F. in a steam environment under a pressure of 50 psi for 2 hours, and the above described coefficients of thermal expansion assure that a tight compact composite hose construction is produced with no voids and with proper mechanical bonding between the core and reinforcement material and cover. After vulcanization, the reel is removed from the autoclave 26, and the mandrel (not shown) is removed from the hose.

Figure 3:
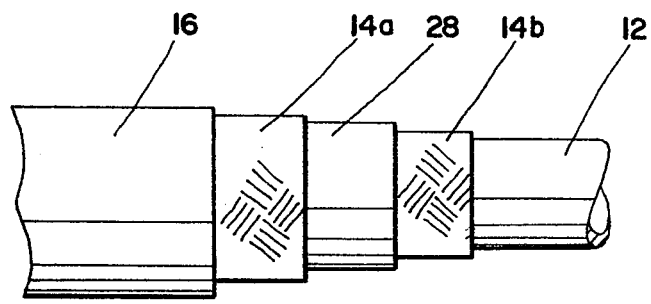
FIG. 3 is a side view, broken away in successive structural layers, of a composite hose structure in accordance with the present invention and having two layers of reinforcement material separated by a layer of insulation material.

In the form of the invention shown in FIG. 3, first and second layers 14a and 14b of reinforcement material are interposed between the core 12 and the cover 16. Again, the reinforcement material may be any typical material used in the hose industry for reinforcement, such as the material previously described for the first embodiment, and the reinforcement layers may be applied as a braid or may be spirally wound about the core.

Interposed between the layers 14a and 14b may be a layer 28 of insulating material. Typically, the insulating material layer 28 is comprised of a thermosetting elastomeric material such as the material previously described for the core 12 and is used to prevent one layer of reinforcement material from abrading against the adjacent layer of reinforcement material.

I claim:

1. A method for producing a hose comprising the sequential steps of forming a hollow elongated inner core of thermosetting elastomeric material which is vulcanizable at a given temperature, said forming being accomplished so that the entire core is substantially uncured, applying strands of reinforcing material to the outer peripheral surface of said entirely uncured core, encapsulating said reinforcing material and uncured core with a thermoplastic elastomeric cover having a melting temperature higher than said given vulcanizing temperature, and thereafter maintaining said core and reinforcing material and cover at a temperature below said melting temperature and no less than said given vulcanization temperature for a time period sufficient to vulcanize said entire core while maintaining the outer peripheral surface of said cover free of any adjacent solid confinement structure, said thermoplastic elastomer having sufficient tensile strength at said maintained temperature and having a coefficient of thermal expansion less than that of the thermosetting elastomeric material whereby said cover restrains free radial expansion of said core and reinforcement during said vulcanization of said core.

2. The method of claim 1 wherein said melting temperature of said cover is at least 350° F. and said given vulcanizing temperature is less than 350°.

3. The method of claim 2 wherein said given vulcanization temperature is sufficiently low relative to said melting temperature that at least about 25% of the tensile strength of said cover is retained at said given vulcanization temperature.

4. The method of claim 2 wherein said vulcanization temperature is between 275° F. and 325° F. and said melting temperature is between 350° F. and 500° F.

5. A method for producing a hose comprising the sequential steps of extruding a hollow elongated inner core of thermosetting elastomeric material at a temperature below a given vulcanization temperature of said material whereby after said extrusion substantially the entire core is uncured, applying strands of reinforcing material to the outer peripheral surface of said uncured core with no intermediate heating of the core tube and in a manner to provide interstices in said strands, extruding a thermoplastic elastomeric material having a melting temperature higher than said given vulcanization temperature over said uncured core and said reinforcing material, and thereafter maintaining said core and reinforcing and cover at a temperature below said melting temperature and no less than said vulcanization temperature for a time period sufficient to vulcanize said core while maintaining the outer peripheral surface of said cover free of any adjacent solid confinement structure, said cover having a coefficient of thermal expansion less than that of said core whereby said cover restrains thermal expansion of said core through said interstices during said vulcanization.

6. The method of claim 5 wherein the tensile strength of said cover at said vulcanization temperature is between 25% and 60% of its ultimate tensile strength.

7. A method for producing a hose comprising the sequential steps of extruding a hollow elongated inner core of thermosetting elastomeric material on a mandrel at an extruding temperature below a vulcanization temperature for said material whereby the entire core is uncured after said extrusion, extruding a thermoplastic elastomeric material as a cover over said core at a temperature above both said extruding temperature and said vulcanization temperature of said core, said cover having a melting temperature higher than said vulcanization temperature, and thermally expanding said core radially outwardly against said cover by subjecting the core and cover to said vulcanization temperature for at least two hours in the presence of steam to vulcanize said core while maintaining the outer peripheral surface of said cover free of any adjacent solid confinement structure, said cover having a coefficient of expansion less than that of said core whereby said cover limits radial expansion of the core during said application of vulcanizing temperature.

8. The method of claim 7 wherein said cover has a melting point of 350° F. to 500° F., said extrusion temperature of said core is between 100° F. and 275° F., and said vulcanization temperature is between 275° F. and 350° F., the tensile strength of said cover at 250° F. is at least 1100 PSI and the coefficient of expansion of said cover is about $8.6 \times 10^{-5}$ inch/inch/C°.

* * * * *